United States Patent [19]
Bonnet

[11] Patent Number: 5,967,290
[45] Date of Patent: Oct. 19, 1999

[54] HIGH SPEED BOBBIN-TYPE SORTER FOR PARCELS

[75] Inventor: Henri Bonnet, Atlanta, Ga.

[73] Assignee: United Parcel Service of America, Atlanta, Ga.

[21] Appl. No.: 08/910,332

[22] Filed: Aug. 13, 1997

[51] Int. Cl.[6] .................................................. B65G 47/46
[52] U.S. Cl. ............................... 198/370.04; 698/370.01; 698/370.1
[58] Field of Search ......................... 198/370.01, 370.03, 198/370.06, 370.07, 370.08, 370.04, 370.1, 371.1

[56] References Cited

U.S. PATENT DOCUMENTS

| | | | |
|---|---|---|---|
| 3,286,811 | 11/1966 | McWilliams | 198/370.04 |
| 3,348,678 | 10/1967 | Flowers . | |
| 3,642,113 | 2/1972 | Burgis . | |
| 3,782,527 | 1/1974 | Petershack . | |
| 4,019,627 | 4/1977 | Eggert et al. . | |
| 4,143,755 | 3/1979 | Keller . | |
| 4,509,636 | 4/1985 | Godbois . | |
| 4,696,386 | 9/1987 | Lem . | |
| 4,880,099 | 11/1989 | Leemkuil et al. . | |
| 5,653,326 | 8/1997 | Liedgens | 198/370.03 |
| 5,699,892 | 12/1997 | Shyr et al. | 198/370.1 X |

FOREIGN PATENT DOCUMENTS

| | | |
|---|---|---|
| 0 287 171 A1 | 10/1988 | European Pat. Off. . |
| 0 569 073 A1 | 11/1993 | European Pat. Off. . |
| 2 164 831 | 8/1973 | France . |
| 2 255 235 | 7/1975 | France . |
| 2 407 149 | 5/1979 | France . |
| 2 464 899 | 3/1981 | France . |
| 25 47 899 | 4/1977 | Germany . |
| 28 18 425 | 11/1979 | Germany . |
| 1320-141 | 6/1987 | U.S.S.R. . |
| 1421-640 | 9/1988 | U.S.S.R. . |
| 1447-736 | 12/1988 | U.S.S.R. . |

*Primary Examiner*—James R. Bidwell
*Attorney, Agent, or Firm*—Jones & Askew

[57] ABSTRACT

A conveyor system including bobbin-type members which can pivot or rotate about a central longitudinal "bobbin axis" to allow selective discharge of packages conveyed by conveying belts mounted within the bobbin members. The bobbin-type members included integral conveyor(s) positioned generally within substantially cylindrical "shells" which are covered with friction-engaging materials. Rotation of the bobbin members causes the cylindrical surface of the bobbin members to engage the packages and discharge them sidewardly. The bobbin members may include an "eccentric" motion if so desired.

39 Claims, 10 Drawing Sheets

(FIRST EMBODIMENT)

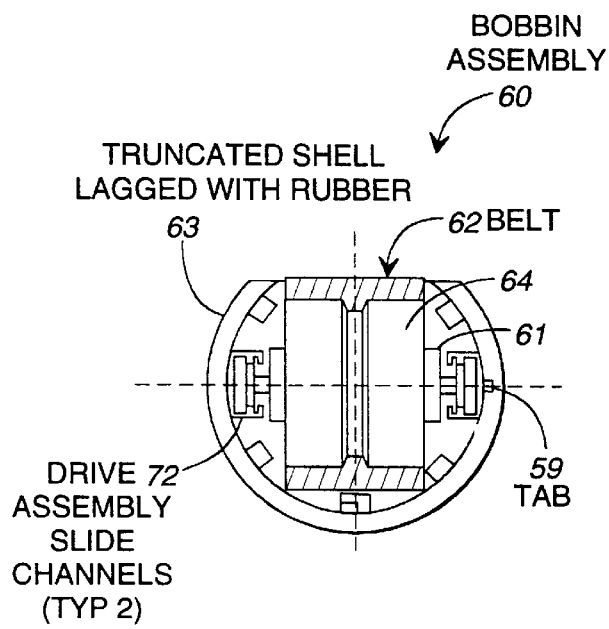
FIG. 4 (SECOND EMBODIMENT)
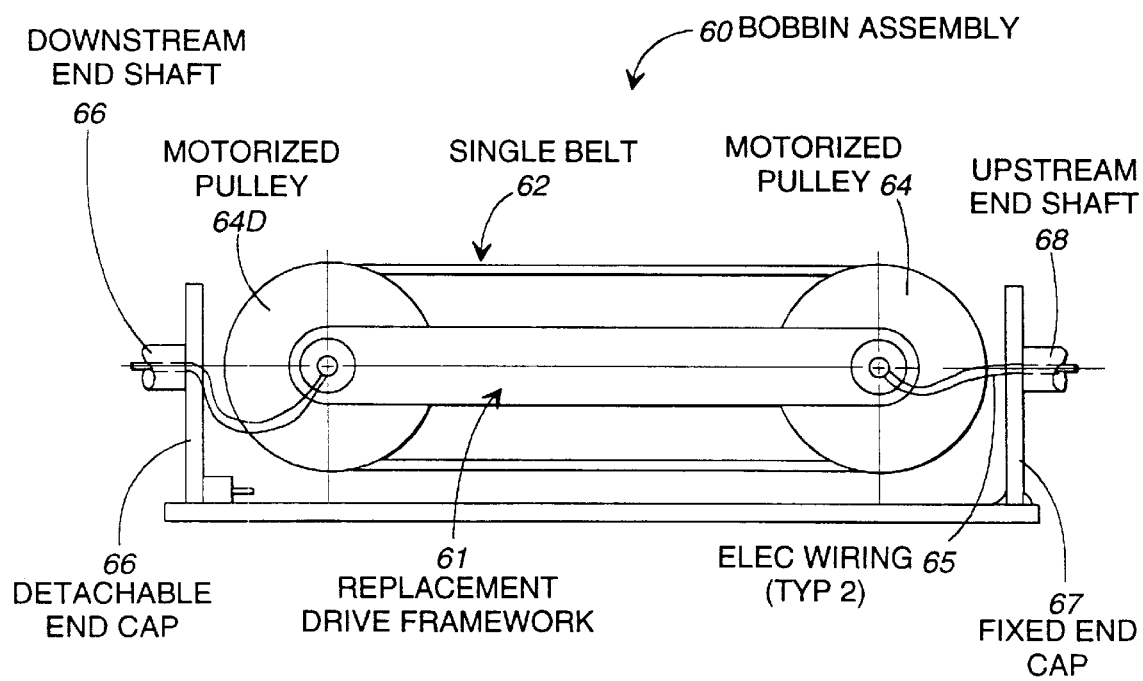
FIG. 5 (SECOND EMBODIMENT)

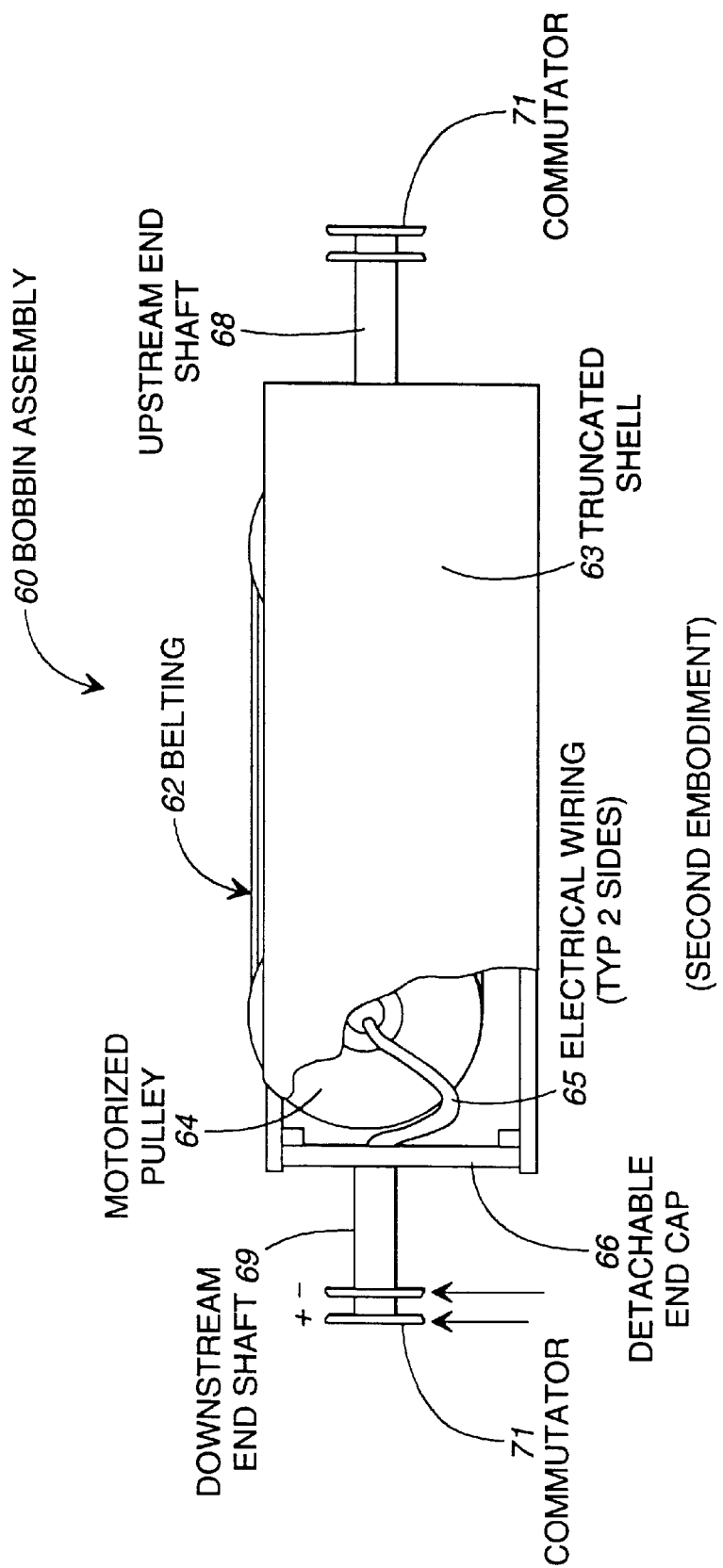
FIG. 6 (SECOND EMBODIMENT)

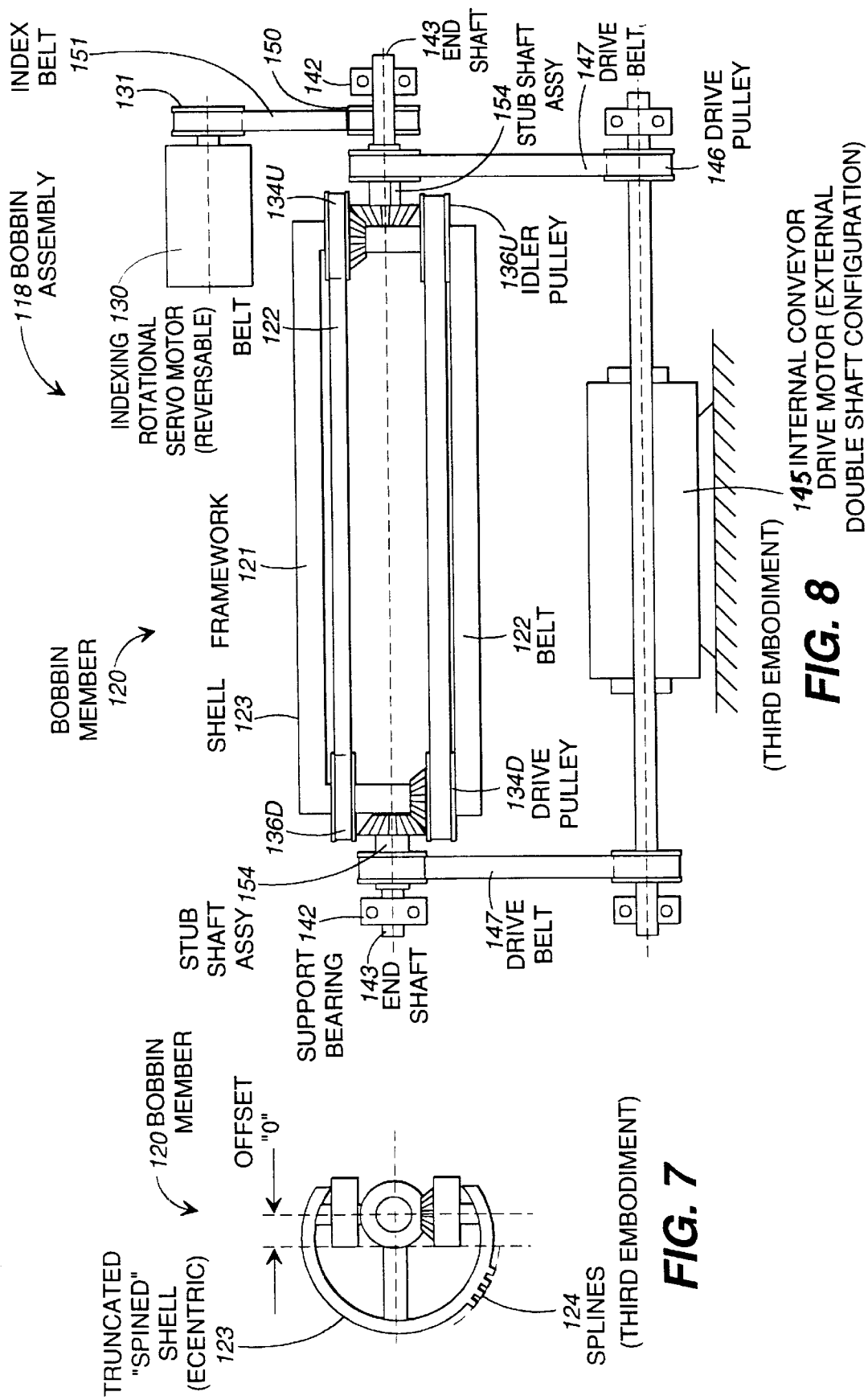

(FOURTH EMBODIMENT)

(FOURTH EMBODIMENT)

(SIXTH EMBODIMENT)

(SIXTH EMBODIMENT)

(SIXTH EMBODIMENT)

(SIXTH EMBODIMENT)

HIGH SPEED BOBBIN-TYPE SORTER FOR PARCELS

TECHNICAL FIELD

This invention relates in general to conveyors, and particularly relates to conveyor systems which have the capability to rapidly and reliably discharge packages or other items thereon to either side of a conveying path, such that the packages or other items may be transported elsewhere.

BACKGROUND OF THE INVENTION

Modern high volume package delivery systems often include package conveying systems that accept packages from one or more loading stations, and transport the packages to a variety of output destinations such as chutes, bins, and subsequent conveyor systems.

One of the most conventional types of conveyors is a belt conveyor, which includes the use of an endless flexible belt which passes over at least two cylindrical rollers, one of which is a drive roller. Packages are placed atop the upwardly-directed "working" surface of the belt conveyor, and are transported in a generally straight direction from end of the conveyor to the other. Another type of conveyor is a "roller" conveyor which con include powered or idling rollers which contact, support, and in certain instances propel the bottom of the package along its path.

Some conveying systems include diversion features which allow for the discharge of objects from a conveying surface at selected stations located along the path of the conveying surface. Some package diverting systems utilize a pusher element mounted relative to a conveying surface which when actuated ejects an adjacently placed package laterally across the conveyor surface to the desired discharge station. Some package diverting systems include the use of diversion elements which lie along the conveyor and provide the diversion forces against the bottom surfaces of the package.

A modular diverter shoe and slat construction disclosed in U.S. Pat. No. 5,127,510 to Cotter describes a modular diverter shoe for use in a slat conveyor. A diverter shoe is mounted to each slat so that the shoe may glide across the slat. The movement of the diverter shoe is affected by a guide pin and coaxial bearing which engages a network of guide tracks located beneath the conveying surface. When a package is to be diverted, a diverting switch is actuated to switch the guide pins for the diverter shoe adjacent to the package onto a diagonal track, which causes the diverter shoe to move across the slat and eject the package.

Another apparatus for sorting objects is disclosed in U.S. Pat. No. 4,732,260 to Canziani. In that system, a conveyor belt is described in which each conveyor element has a slit. The pusher elements are slidably inserted into the slits and each pusher element is connected to a drive element that extends beneath the conveyor surface. The drive element is attached to rollers and interacts with a series of cams or guide rails located beneath the conveyor. The cams include an electro-pneumatic two-position end portion. In one position, the cam engages the drive element rollers and slides the pusher element. In a second position, the rollers do not engage the guide rails.

The prior art also discloses the use of cradling- or conveying-type apparatuses having limited tilting ranges. Upon the tilting of the apparatuses, item are sidewardly ejected.

Example of "cradling" types of prior art are shown in Soviet Reference Nos. 1320-141-A and 1421-640-A. As can be seen, these references generally show the use of a conveyor section which pivots about an axis parallel to the conveying axis in order to eject items sidewardly from their conveying path. These "cradling" configurations tend to maintain the logs in a desired "cradled" position until the cradle is titled so much that the logs roll out of the cradle under the influence of gravity.

U.S. Pat. No. 1,549,499 to Parker discloses the use of a foot actuated lever 8 for controlling the raising of elevating rollers 10 into a conveying path. The rollers 10 when raised above the normal conveying plane and into contact with a package, cause the package to tilt and roll off the rollers 10 and sidewardly off the conveyor under the influence of gravity.

U.S. Pat. No. 3,348,678 to Flowers discloses the use of a conveyor section which is tiltable to either side by the use of a pair of linearly-actuating fluid cylinders.

The amount of "down time" a conveying system or sorting system is shut down for repairs and/or maintenance significantly impacts operating efficiency. Thus, reliability and ease of repair are major requirements. Reliability can be increased and down time reduced by constructing package conveying and sorting systems where mechanical assemblies may be quickly and easily removed and replaced without the use of tools. Such construction may be accomplished by use of detachable mechanical assemblies such as package diverters or by mounting mechanical assemblies on modular conveying systems such that the failed mechanical assemblies or the conveyor sections housing the failed assemblies may be quickly removed and replaced. Furthermore, because of the increased speeds required of modern package handling systems, reduction of noise levels is also a major requirement.

Although the prior art may include advantages, disadvantages likewise exist. The prior art does not include a rotatable member including an integral conveyor, which can be used to quickly and reliably discharge items such as parcel to either side of a conveyor path. The prior art also lacks the allowance for quick and easy replacement of critical moving parts within the apparatus which tend to first wear out or otherwise require servicing, therefore reducing the amount of "down time" involved.

SUMMARY OF THE INVENTION

The present invention overcomes deficiencies in the prior art by providing a conveying system including a rotatable "bobbin" having an integral conveyor, which allows for quick and reliable package discharge to either side of a conveyor path. This replaceable "bobbin" configuration allows for quick and easy replacement of critical moving parts within the apparatus which tend to first wear out or otherwise require servicing, therefore reducing the amount of "down time" involved.

Generally described, the present invention is directed towards an apparatus for conveying an item along a conveying path or selectively discharging the item sidewardly from the path, the apparatus comprising, a substantially stationary frame, a pivoting conveyor mount pivotably mounted relative to the frame along a pivot axis, the pivoting conveyor mount being pivotable within a pivot range extending to either side of a neutral position, a conveyor mounted relative to the conveyor and defining a conveying surface configured to vary with the rotation of the conveyor mount, but being substantially horizontal and facing substantially upwardly when the pivoting conveyor mount is in the neutral position, and means or pivoting the conveyor mount in either of two directions from the neutral position to cause packages positioned atop the conveyor to be discharged therefrom towards either of the two corresponding the discharge locations.

The present invention is further directed towards an apparatus for attachment to a substantially stationary frame for conveying an item along a conveying path or selectively discharging aid item sidewardly from the path, the apparatus comprising a pivoting conveyor mount pivotably mounted relative to the frame along a pivot axis, the pivoting conveyor mount being pivotable within a pivot range extending to either side of a neutral position, and a conveyor mounted relative to the conveyor and defining a conveying surface configured to vary with the rotation of the conveyor mount, but being substantially horizontal and facing substantially upwardly when the pivoting conveyor mount is in the neutral position, the pivoting conveyor mount configured to either of two directions from the neutral position to cause packages positioned atop the conveyor to be discharged therefrom towards either of the two corresponding side discharge locations.

The present invention is further directed towards an apparatus for conveying an item along a conveying path or selectively discharging aid item sidewardly from the path, the apparatus comprising a substantially stationary frame, a pivoting conveyor mount pivotably mounted relative to the frame along a pivot axis, the pivoting conveyor mount being pivotable within a pivot range extending to either side of a neutral position, a conveyor mounted relative to the conveyor and defining a conveying surface configured to vary with the rotation of the conveyor mount, but being substantially horizontal and facing substantially upwardly when the pivoting conveyor mount is in the neutral position, electric motor means for powering the conveyor, the electric motor means mounted relative to the pivoting conveyor mount to pivot therewith, and means or pivoting the conveyor mount in either of two directions from the neutral position to cause packages positioned atop the conveyor to be discharged therefrom towards either of the two corresponding side discharge locations.

The present invention is further directed towards an apparatus for conveying an item along a conveying path or selectively discharging aid item sidewardly from the path, the apparatus comprising a substantially stationary frame, a rotating member pivotably mounted relative to the frame along a pivot axis, the rotating member being pivotable within a pivot range extending to either side of a neutral position, a conveyor mounted relative to the conveyor and defining a conveying surface configured to vary with the rotation of the conveyor mount, but being substantially horizontal and facing substantially upwardly when the pivoting conveyor mount is in the neutral position, package engagement means attached to the exterior of the rotating member, and means or pivoting the conveyor mount in either of two directions from the neutral position to cause packages positioned atop the conveyor to be discharged therefrom towards either of the two corresponding side discharge locations and urged towards the side discharge stations upon contact with the package engagement means.

The present invention is further directed towards an apparatus for conveying an item along a conveying path or selectively discharging aid item sidewardly from the path, the apparatus comprising a substantially stationary frame portion, a rotating member pivotably mounted relative to the frame along a pivot axis, the rotating member being pivotable within a pivot range extending to either side of a neutral position, conveyor means mounted relative to the rotating member and defining first and second, opposing conveying surfaces configured to vary with the rotation of the rotating member, each being substantially horizontal and facing substantially upwardly and downwardly, respectfully, when the pivoting conveyor mount is in the neutral position, and means or pivoting the conveyor mount in either of two directions from the neutral position to cause packages positioned atop the upwardly-directed conveyor surface to be discharged therefrom towards either of the two corresponding side discharge locations.

The present invention is further directed towards an apparatus for conveying an item along a conveying path or selectively discharging aid item sidewardly from the path, the apparatus comprising a substantially stationary frame portion, a first rotating member pivotably mounted relative to the frame along a pivot axis, the rotating member being pivotable within a pivot range extending to either side of a neutral position, a second rotating member pivotably mounted relative to the frame along a second pivot axis substantially parallel to the first pivot axis, the second rotating member being pivotable within a pivot range extending to either side of a neutral position, first conveyor means mounted relative to the first rotating member and defining a conveying surface configured to vary with the rotation of the first rotating member, the first conveying surface being substantially horizontal and facing substantially upwardly when the first rotating member is in the neutral position, and second conveyor means mounted relative to the first rotating member and defining a second conveying surface configured to vary with the rotation of the second rotating member, the second conveying surface being substantially horizontal and facing substantially upwardly when the second rotating member is in the neutral position, and means or pivoting the first and second rotating members in either of two directions from the neutral position to cause packages positioned atop the upwardly-directed conveyor surface to be discharged therefrom towards either of the two corresponding side discharge locations.

The present invention is further directed towards a method for conveying an item along a conveying path or selectively discharging aid item sidewardly from the path, the method comprising the steps of:

a) providing the following assembly:

1) a substantially stationary frame portion, a first rotating member pivotably mounted relative to the frame along a pivot axis, the rotating member being pivotable within a pivot range extending to either side of a neutral position, 2) a second rotating member pivotably mounted relative to the frame along a second pivot axis substantially parallel to the first pivot axis, the second rotating member being pivotable within a pivot range extending to either side of a neutral position;

3) first conveyor means mounted relative to the first rotating member and defining a conveying surface configured to vary with the rotation of the first rotating member, the first conveying surface being substantially horizontal and facing substantially upwardly when the first rotating member is in the neutral position; and 4) second conveyor means mounted relative to the first rotating member and defining a second conveying surface configured to vary with the rotation of the second rotating member, the second conveying surface being substantially horizontal and facing substantially upwardly when the second rotating member is in the neutral position; and 5) means or pivoting the first and second rotating members in either of two directions from the neutral position to cause packages positioned atop the upwardly-directed conveyor surface to be discharged therefrom towards either of the two corresponding side discharge locations;

b) conveying a package to a location atop the first and second conveyors; and c) rotating the such that the item is discharged thereby.

Therefore, it is an object of the present invention to provide an improved automated conveyor sorting system.

It is a further object of the present invention to provide a conveyor system which includes side discharge capabilities.

It is a further object of the present invention to provide an improved ejection mechanism for ejecting items from a conveying surface.

It is a further object of the present invention to provide an improved apparatus for conveying and sorting items that is simple in construction.

It is a further object of the present invention to provide an improved apparatus for conveying and sorting items that is simple in operation.

It is a further object of the present invention to provide an improved conveyor which may be easily dismantled for repair.

It is a further object of the present invention to provide an improved conveyor which may be easily dismantled for maintenance.

It is a further object of the present invention to provide a conveyor which operates at reduced noise levels.

It is a further object of the present invention to provide an ejection mechanism for ejecting items from a conveying surface which may be removed from the conveying surface easily.

It is a further object of the present invention to provide an ejection mechanism for ejecting items from a conveying surface which may be removed from the conveying surface quickly.

It is a further object of the present invention to provide an improved apparatus for conveying and sorting items that can be repaired by quickly removing failed sub-assemblies.

Other objects, features, and advantages of the present invention will become apparent upon reading the following detailed description of the preferred embodiment of the invention when taken in conjunction with the drawing and the appended claims.

BRIEF DESCRIPTION OF THE DRAWINGS

FIG. 4 is a downstream end elevational view of a portion of a second embodiment of the present invention, being a bobbin assembly 60. This view includes a cross-section view of the truncated shell 63 of the assembly 60, and a cross-section view of a pair of drive assembly slide channels 72. The belt 62 is also shown in cross-section. The removable pulley 64 and its associated replaceable framework are not shown in cross-section.

FIG. 5 is a right side elevational view of the bobbin assembly of FIG. 4, with various elements shown in normal or cross-sectional view. The shell 63 is shown in cross-section. The two motorized pulleys, fixed end cap and detachable end cap are not shown in cross-section.

FIG. 6 is an isolated view of the bobbin assembly 60 shown in FIGS. 4 and 5. This is a partial cross-sectional view, with a section of the bobbin assembly shell 63 removed to expose one of the two motorized pulleys 64.

FIG. 7 is a downstream end partial cross-sectional view of an isolated bobbin member 120 according to a third embodiment of the present invention. This view shows the eccentric shell 123 of the bobbin member in cross-section, exposing the side-by-side dual-endless belt construction. The belts are likewise shown in cross-section.

FIG. 8 is a top plan partial cross-sectional view of a bobbin assembly 118, including a bobbin member 120, a reversible indexing rotational servo motor 130, and an internal conveyor drive motor 150. The bobbin member 120 is shown in partial cross-section (its shell is in cross section), but the remaining items are shown in conventional view.

DETAILED DESCRIPTION OF THE PREFERRED EMBODIMENT

General Construction and Operation

Enclosed please find FIGS. 1–15, which illustrate various embodiments (six (6) in all) of the invention. In summary, the invention relates to the use of selectively rotatable "bobbins" having integral conveyors, which can either pass parcels along a conveyor path or alternatively eject parcel from their paths by rotation.

Figure 1:
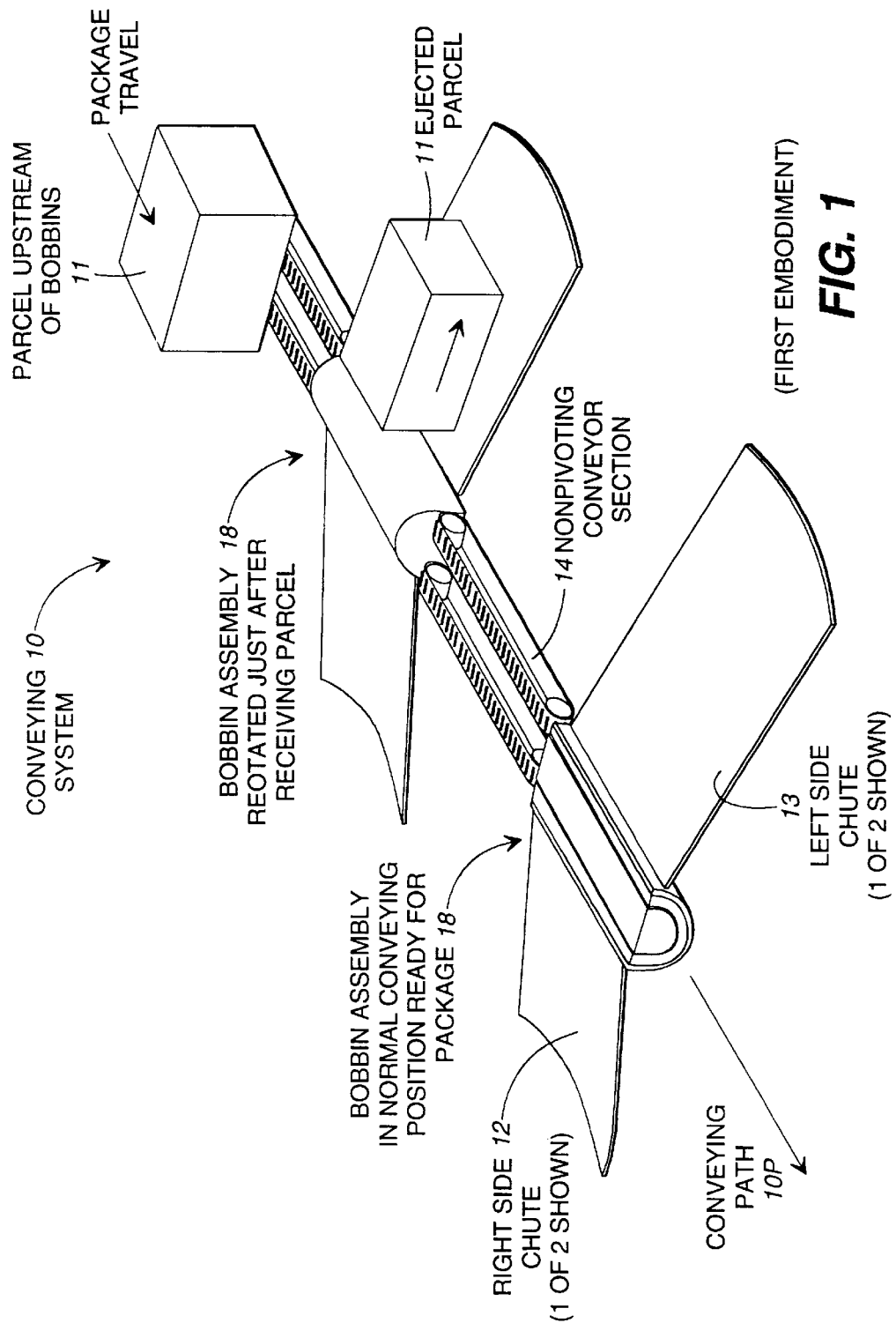
FIG. 1 is a pictorial view of a conveying system 10 according to the present invention.
Figure 2:
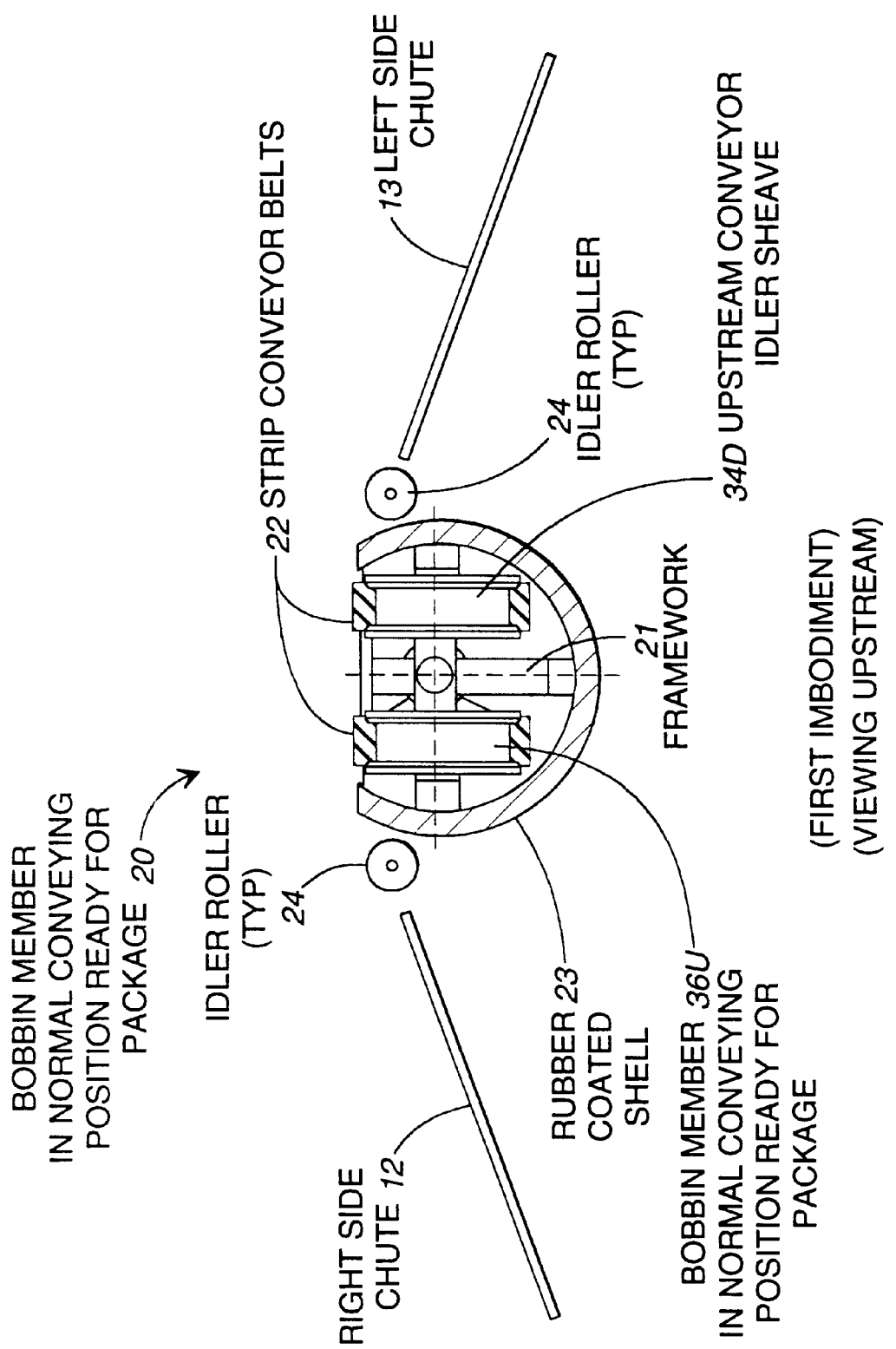
FIG. 2 is a downstream end, partial cross-sectional view of a bobbin member in its "normal" conveying position ready to accept a package (not shown) atop its top surface. The bobbin member 20 is shown intermediate two idler rollers 24, and also intermediate right and left side chutes 12, 13, respectively, which are stationary and are configured to accept packages which are discharged sidewardly from the bobbin member 20 when it is indexed to either side of its "neutral" position shown in this figure.
Figure 3:
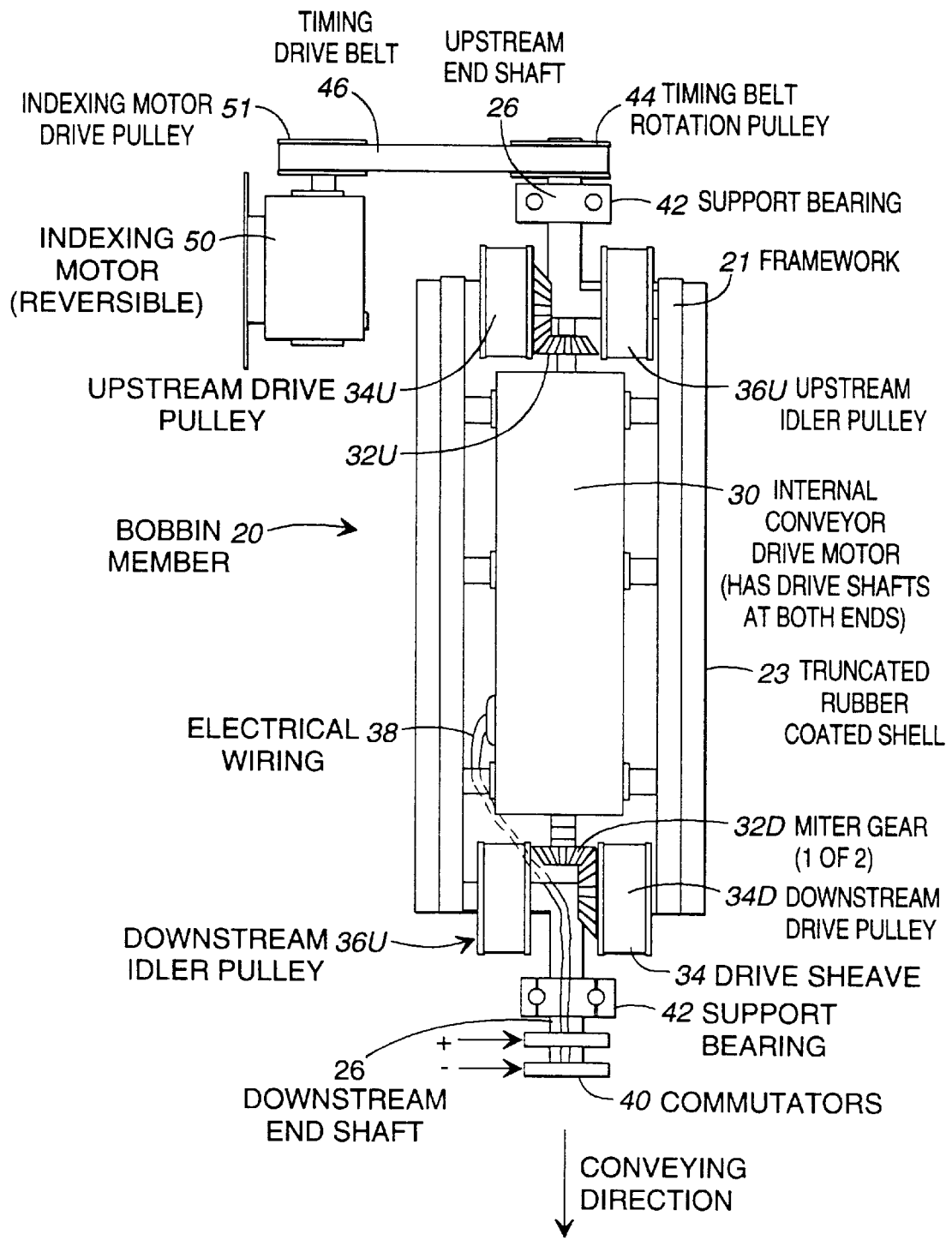
FIG. 3 is a top plan view of the bobbin assembly 18 of FIG. 1, the view including a cross-section of the shell 23 of the bobbin assembly and showing other elements (such as bearings) in illustrative form for ease of viewing. Also shown is a reversible indexing motor 50 which by means of an endless belt 46 can be used to selectively "index" the bobbin member in a rotational manner about its longitudinal axis.

First Embodiment (FIGS. 1–3)

Referring first to FIGS. 1–3, a first embodiment is shown. Generally described, parcels are carried at high speed by a narrow belt conveyor consisting of two conveyor belts moving in the same direction at the same speed. The high speed ejection device consists of a bobbin (itself also having two conveyor belts) which is able to rotate around a horizontal axis 360° and can be indexed after each complete turn. The overall sorting system consists of a repetition of the above elements with any number of discharge stations. The bobbins are about five feet long in order to eject the longest package. The entire system of ejection stations is controlled by a programmable logic controller.

Packages entering the system are single filed and adequately spaced. Their travel speed is between 300 to 400 feet per minute. When a package reaches its point of exit the bobbin rapidly spins 360° around its longitudinal horizontal axis. The outer skin of the bobbin is covered or "lagged" with a high friction rubber material as shown in FIG. 3. The rapid spin of the bobbin induces the parcel to exit the system either to the left or to the right depending on the direction the bobbin is spinning. Each direction of spin pertains to a separate destination. The bobbin resumes to its normal position before receiving the next package in line. The system is fully reversible and is able to operate in both directions.

Reference is now particularly made to FIG. 1, which illustrates a conveying system 10 according to the present invention. This conveying system 10 includes various conveying sections laying generally along a conveying path 10P. These conveying sections include conventional nonpivoting conveying sections such as 14, as well as bobbin assemblies 18 according to the present invention. FIG. 1 illustrates two similar bobbin assemblies 18, with the upstreammost bobbin assembly being in its "just rotated" position, and the downstreammost bobbin assembly 18 shown in a normal conveying position ready for a parcel. Each bobbin assembly in FIG. 1 is shown associated with a corresponding pair of side chutes, including a right side chute 12 and a left side chute 13.

As shown in FIG. 1, a parcel 11 is shown upstream of both bobbin assemblies, and is lying upon a nonpivoting conveyor section 14 which is the first apparatus lying along the conveying path 10P in FIG. 1. The parcel 11 begins its travel along an axis generally parallel to the conveying path 10P. Upon being placed upon the first, most upstream, bobbin assembly 18, a parcel may be sidewardly ejected into one of the side chutes 12, 13. In the drawing of FIG. 1, two right side chutes 12 are shown and two left side chutes 13 are shown, and an ejected parcel 11 is shown as being discharged from the upstreammost bobbin assembly 20 into one of the two left side chutes 13.

If a package is not discharged after being placed upon the upstreammost bobbin assembly 18, it can be passed thereby to the nonpivoting conveyor portion 14, which is shown between the two bobbin assemblies 18. This nonpivoting conveyor portion 14 does not provide any side discharge features in the preferred embodiment of the present invention, but instead passes parcels or similar items from bobbin assembly to bobbin assembly.

As in the case of the first-encountered bobbin assembly, upon placement of a parcel 11 onto the downstreammost bobbin assembly 18, the bobbin assembly 18 can be selectively energized so as to discharge the package to either of its associated left or right side chutes 20, or alternatively may simply pass the parcel along the conveying path to another nonpivoting conveyor (not shown), to another bobbin assembly 20 (not shown), or to an end chute (not shown).

Figure 15:
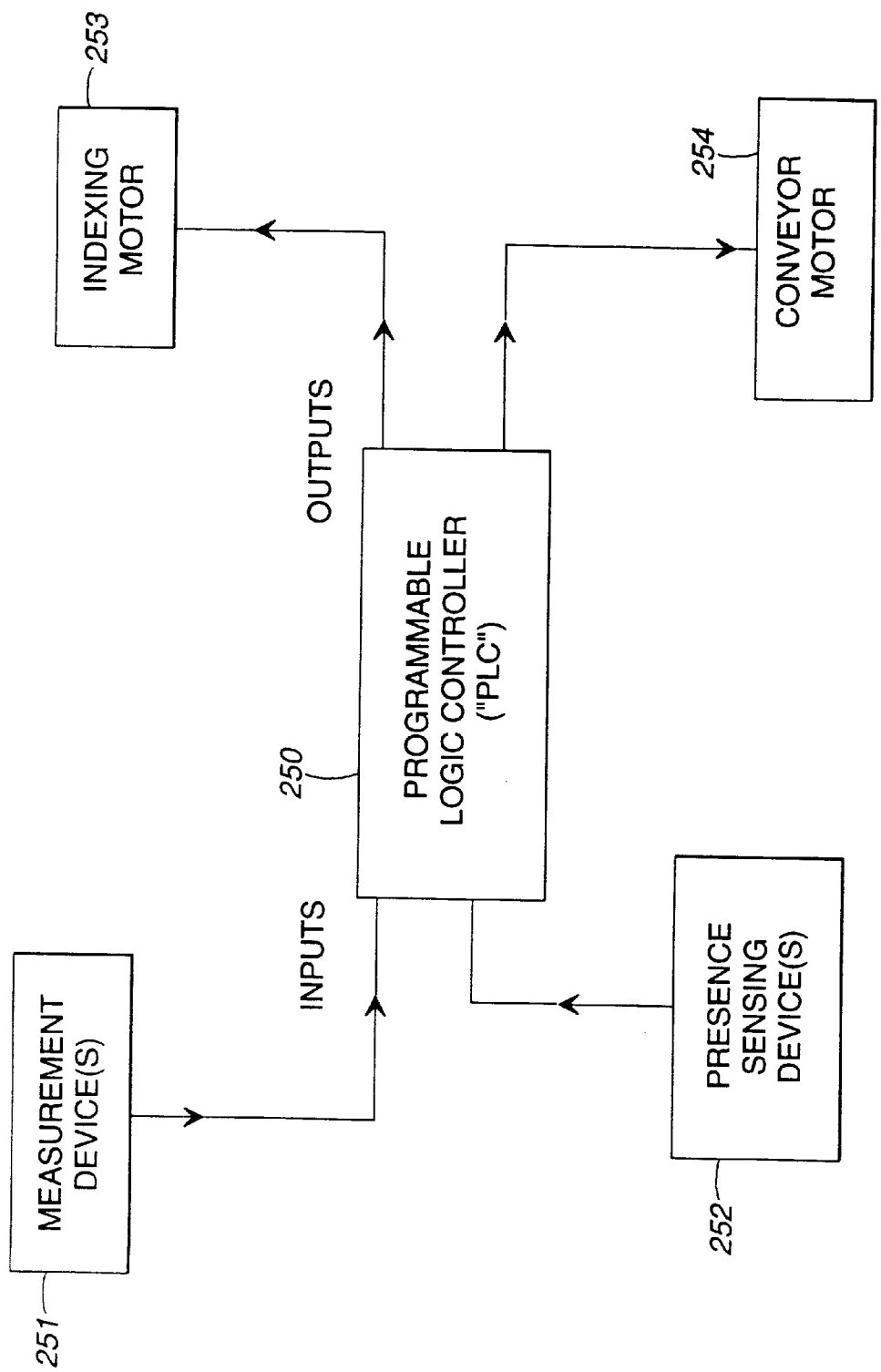
FIG. 15 is a block view illustrating the interaction of a programmable logic controller ("PLC") 250, which receives signals from measurement device(s) 251 and presence sensing device(s) 252, and transmits signals to indexing motor(s) 253 and conveyor motor(s) 254.

Therefore, it maybe seen that the conveying system 10 allows for the conveying of a parcel or parcels 11 along a conveying path 10P, with selective discharge of parcels to the side of the conveyor path. This selective discharge can be done by means of a manual switch provided by a operator, or may alternatively be controlled by a PLC (programmable logic controller) as shown in FIG. 15, which can accept signals from upstream sources such as package measurement package pressure sensing devices, can compare said signals to a look-up table if so desired, and provides output signals to the indexing motors and the integral conveyor motors.

FIG. 2 is an "upstream" view of a transverse cross-section of a bobbin member 20, in its normal conveying position, ready for a package to be placed thereon. In FIG. 2, the bobbin member 20 may be seen to include two strip conveyor belts 22, a framework 21, and a truncated rubber coated or "lagged" shell 23. The overall conveying system 10 of FIG. 1 also includes idler rollers 24 supported by a stationary frame of the conveying system, and the previously-discussed left and right side chutes 12, 13.

As will be discussed in further detail later in this application, the strip conveyor belts 22 are endless belts, and are mounted for movement along endless paths by means of idler and drive pulleys which are rotatably mounted relative to a framework 21 of the bobbin member 20. Generally described, the strip conveyor belts 22 serve to transport packages placed thereon along a conveying path such as 10P shown in FIG. 1, assuming the bobbin member 20 does not rotate. However, if the bobbin member 20 is allowed to rotate while a package 11 is atop the strip conveyor belts, the parcel 11 will be ejected sidewardly depending upon the direction of rotation. Depending on the rotation of the bobbin member 20, the parcel can be discharged to the left or right side chutes 12, 13.

Reference is now also made to FIG. 3, which is top plan view of a bobbin assembly 18. The bobbin assembly 18 generally includes a bobbin member 20 which is rotatably mounted relative to a frame (not shown) of the conveying system 10, which is selectively rotated by a means of an indexing motor 50, through a connecting timing drive belt 46. Generally described, selective energizement of the indexing motor 50 causes the bobbin assembly 18 to rotate along its longitudinal axis to provide the selective discharge described above.

The bobbin member 20 includes a substantially rigid framework 21. Attached to the outside of the framework 21 is a truncated rubber coated shell 23. The truncated rubber coated shell 23 is substantially cylindrical in the embodiment shown in FIGS. 2 and 3, with the exception being that it is "truncated" from an otherwise cylindrical configuration. This "truncation" provides for the cross-section shown in FIG. 2, which allows the strip conveyor belts to be the highest members in the cross-section as it is positioned in FIG. 2. This configuration allows a package placed atop the bobbin member 20 when in the position of FIG. 2 to rest atop the strip conveyor belts 22 only.

The bobbin member 20 also includes drive and idler pulleys 34, 36, which are rotatably mounted relative to the framework 21 of the bobbin member 20, along axes which are substantially coparallel and transverse to the longitudinal axis of the elongate bobbin assembly 18. The drive and idler pulleys 34, 36, are configured to support the strip conveyor belts 22 and to allow them to be driven along their respective endless paths. Each bobbin member 20 includes four pulleys, an upstream drive pulley 34U, a downstream drive pulley 34D, an upstream idler pulley 36U, and a downstream idler pulley 36D. Each of the two strip conveyor belts 22 is supported by one drive pulley 34, and one idler pulley 36. In the configuration shown in FIG. 3, the "downstream" drive pulley 34D works in cooperation with an upstream idler pulley 36U, to support and drive one of the strip conveyor belts 22. Similarly, an upstream drive pulley 34U and downstream idler pulley 36D support and drive the other of the two strip conveyor belts 22 along their conveying paths.

The two drive pulleys 34D, 34U, are rigidly attached relative to miter gears which are respectively driven by upstream and downstream miter gears 32U, 32D. These two miter gears are rigidly attached relative to opposing end shafts which extend from each end of the elongate internal conveyor drive motor 30. As will be discussed in detail later, the drive motor 30 rotates the upstream and downstream miter gears 32U, 32D through a direct-drive configuration, thus causing the belts 22 to move along their endless paths.

As noted above, the internal drive motor 30 includes drive shafts at both ends. These drive shafts, in the preferred embodiment, are substantially coaxial. The internal drive conveyor motor 30 has its housing substantially rigidly mounted relative to the framework 21 of the bobbin member 20, such that the housing rotates along with the bobbin member 20.

The framework 21 of the bobbin member 20 includes two axially-extending bobbin end shafts 26 which extend in opposing directions from each of the longitudinal ends of the bobbin member 20. Each of the end shafts 26 (which can be considered to include an "upstream" and a "downstream" end shaft) is substantially elongate and includes a portion which can be captured by a rotational bearing. Such a rotational bearing can be such as support bearings 42 shown in at least FIG. 3 which are mounted relative to the frame (not shown) of the conveying system 10. These support bearings 42 allow for rotatable mounting of the bobbin member 20 relative to the frame of the conveying system 10.

A timing belt rotation pulley 44 is, in the preferred embodiment, substantially rigidly attached to the upstream end of the upstream end shaft 26. This timing belt rotation pulley 44 supports a timing drive belt 46 which is also wrapped around a indexing motor drive pulley 51, which is driven by an indexing motor 50. This indexing motor 50 is substantially rigidly mounted relative to the frame of the conveying system 10. Such a configuration allows for the selective "indexing" type of rotation of the bobbin member 20 about its longitudinal axis relative to the frame of the conveying system 10 by selective energizement of the indexing motor Proximate the "downstream" end of the bobbin member 20 are located two commutators 40, which allow for supply of electric power through electrical wiring 38. As may be understood, these two commutators include two associated electrical wires, which allow for stationary contacts to provide a sliding connection therebetween. Stationary contacts contact the commutators 40, which allow for the supply of electrical energy through electrical wiring to the internal conveyor drive motor 30.

Operation is as follows. To allow the bobbin assembly to simply "pass on" parcels, the indexing motor 50 is not operated. Instead, the internal conveyor drive motor 30 is allowed to run at a speed suitable to allow it to rotate its miter gears 32U, 32D, which correspondingly drive the miter gears fixed relative to the drive pulleys 34U, 34D. These drive pulleys 34U, 34D correspondingly drive the two strip belts 22 along their endless paths, such that packages placed thereon can be conveyed along a direction substantially parallel to the longitudinal (and rotational) axis of the bobbin member 20. If side discharge is desired, the indexing motor 50 is energized to rotate in either of its two rotational directions. Rotation of the indexing motor causes the indexing motor drive shaft pulley 51 to rotate, causing the timing drive belt 46 to move along is endless path, causing the timing belt rotation pulley 44 to rotate. As the timing belt rotation pulley is attached to one of the two end shafts 26 of the bobbin member 30, this causes the bobbin member 20 to rotate about its longitudinal axis. The presence of the commutators 40 allow for electrical power to still be supplied to the internal conveyor drive motor 30, so that it can still drive the belts 22 even as the bobbin member is rotating.

Second Embodiment (FIGS. 4–6)

Reference is now made to FIGS. 4–6, which illustrate a second embodiment of the present invention, including a bobbin assembly 60 according to the present invention. This bobbin assembly 60 allows for selective removal of a detachable subassembly (which includes the conveyor belts) from within a truncated shell subassembly.

The detachable subassembly includes a detachable framework 61, a single belt 62, two motorized pulleys 64U, 64D, and electrical wiring 65. The detachable framework 70 includes elongate tab members 59, which slide within elongate slide channels which are rigidly mounted relative to the inside of the truncated shell 63. As noted below, this allows for relative quick and easy replacement of the detachable subassembly from within the shell 63.

The truncated shell subassembly includes a truncated shell 63, a detachable end cap 66, a fixed end cap 67, and two parallel guide channels 72. The detachable end cap 66 is detachably connected to the downstream end of the truncated shell 63 by bolting or other suitable means. The detachable end cap 615 includes a substantially planar end plate and an end shaft 69 extending downstream in a perpendicular manner from the downstream planar side surface of the detachable end cap end plate. Electrical commutators 71 on the end shafts 68, 69 (see FIG. 6) allow for a dual electrical connection between the rotating bobbin assembly 60 and a stationary supporting structure (not shown).

The fixed end cap 67 likewise includes a substantially planar end plate, and an end shaft 68 extending upstream in a perpendicular manner from the upstream planar side surface of the fixed end cap end plate.

The two end shafts 68, 69, are substantially aligned along their longitudinal axes and may be understood to provide the means for rotatably mounting the bobbin assembly 60 relative to a stationary frame.

The two parallel guide channels 72 are located within the truncated shell's interior cavity and are configured to each accept a pair of sidewardly-directed headed tab members 59 in a sliding manner, such that the detachable subassembly can be slid in and out of the truncated shell subassembly.

To remove the detachable drive framework from the truncated shell subassembly, the detachable end cap 66 is removed from the remainder of the bobbin assembly 60. The electrical connections are separated as needed, and the detachable drive framework is withdrawn from the truncated shell subassembly, during which the tab members 59 slide along and eventually out of the channels 72. To install the detachable drive framework into the truncated shell subassembly, the process is essentially reversed, in that the detachable framework is pushed all the way into place, and the detachable end cap 66 is then bolted or otherwise fastened into place. The electrical connections between the motorized pulleys 64 are then made complete, and the bobbin assembly 60 is completely assembled as shown in FIG. 6. It is then ready to install into an overall system such as shown in FIG. 1.

As may be seen, both of the motorized pulleys 64 are powered, to provide as much power to the belt as possible. As may be understood, space is limited for the internally-mounted drive motors(not shown), as they are positioned inside of the path of the drive belt and within the detachable drive framework 61.

The above removable configuration allows for relative quick and replacement of the subassembly, which is a distinct advantage in preventing or reducing downtime.

Third Embodiment (FIGS. 7–8)

FIGS. 7 and 8 illustrate a third embodiment of the present invention, which includes an external motor for driving the rotating conveyor. This bobbin assembly 118 includes an externally-mounted internal conveyor drive motor 145 for driving internal conveyor parts of a bobbin member 120.

The bobbin member 120 includes a framework 121, which supports an outer shell 123. The shell 123 in the configuration includes external integral "splines" 124 which are discussed in detail later, or could also be coated with a rubber or other suitably engaging material, but its shape differs from the shell shown in, for example, FIG. 4, in that the shell is "eccentricially" mounted. That is, the outer circumferential surface of the shell 123 is not mounted relative the center of rotation of the bobbin member 120 so as to provide a substantially constant radius between the circumferential surface of the shell 123 and the rotational axis of the bobbin member, instead there is an offset "O". This provides an "eccentric" motion during rotation. Such a motion is characterized by the fact that as the bobbin member 120 rotates from is normal conveying position, the lagged surface tends to rise as rotation continues, such that a "peak" height of the lagged surface is reached upon an 180 degree rotation of the bobbin member 120. This is thought to be advantageous in moving heavier packages.

As in the previous embodiment, two strip conveyor belts are used in this embodiment, strip conveyor belts 122. As in the previous embodiment, for each strip conveyor belt 122 is associated one drive pulley and one idler pulley. Therefore, for each bobbin member 120 there are four pulleys, an upstream drive pulley 134U, a downstream drive pulley 134D, an upstream idler pulley 136U and a downstream idler pulley 136D.

A pair of end shafts 143 extend in opposite directions from the bobbin member 120 and are rigidly mounted relative to its framework 121, and rigidly support the framework 121 for rotation relative therewith. The end shafts 143 are supported for rotation relative to the stationary frame (not shown), by a pair of support bearings 142.

At one end of the upstream end shaft 143 is attached an end shaft pulley 150, which is driven by an index belt 151, which is itself driven by a drive pulley 131 driven by an indexing rotational servo motor 130. This indexing rotational servo motor 130 is reversible for reasons discussed elsewhere in this application, but in general, this is to allow indexing rotation of the bobbin member in either direction for at least 180 degrees.

At each longitudinal end of the bobbin member 120 is positioned a pair of hollow stub shaft assemblies 154. Each of these hollow stub shaft assemblies includes a central hollow shaft, to which is rigidly mounted on opposing ends a drive pulley and a beveled gear. The central hollow stub shaft is rotatably mounted around an associated end shaft 143, such that it can rotate around its longitudinal axis, which is substantially coaxial with the longitudinal axis of the associated end shaft. A suitable bearing is provided to provide rotational support between the stub shaft assembly and the central shaft 142.

The beveled gear of each stub shaft assembly 154 id engaged with a corresponding beveled gear which is attached to each of the drive pulleys 134U, 134D.

As noted above, a drive motor 145 is externally mounted relative to the bobbin member 120, but nevertheless provides for power to drive the strip conveyor belts 122 of the bobbin member 120. This is provided by the following drive connection. The drive motor 145 is of an external double shaft configuration, that is it includes two drive shafts which extend in opposite directions from the longitudinal ends of the drive motor 145. Each of these drive shafts have substantially coaxial longitudinal axes, and are driven at substantially the same speed. Each of the two drive shafts of the two drive shafts of the drive motor 145 is supported by a support bearing as known in the art. Adjacent each of the support bearings is a drive pulley 146 rigidly mounted relative to each of the two end shafts. As similar drive configurations are attached relative to each of the two end shafts, only one will be described by means of example.

A drive pulley 146 is rigidly mounted relative to one drive shaft of the drive motor 150. This drive pulley is configured to support a drive belt 147, which also passes around the drive pulley of one of the hollow stub shaft assemblies 154 described above. Therefore, as may be understood, by rotating the drive shafts of the drive motor 145, the two stub shaft assemblies are likewise rotated. Rotation of these two stub shafts causes rotation of the beveled gears attached to the two drive pulleys 134U, 134D. These drive pulleys cause driving of the two strip conveyor belts 122 and preferably the same direction at preferably the same speed.

It may be understood that it is also possible to drive both of the belts 122 with the use of one drive belt 147 and drive pulley 146, but using an "axle" configuration which would rigidly support one bevel gear and both drive pulleys.

Figure 9:
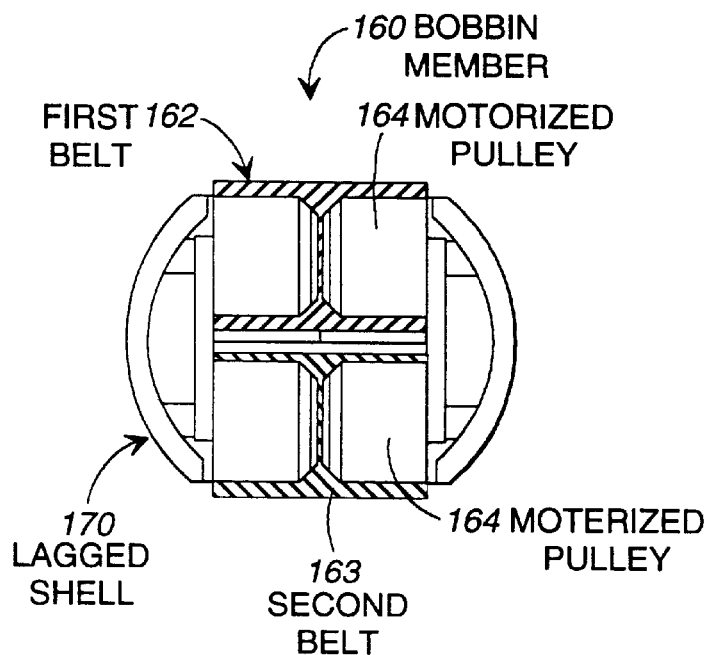
FIG. 9 is a downstream end partial cross-sectional view of an isolated bobbin member 160 according to a fourth embodiment of the present invention. This view shows the shell 170 in cross-section, exposing a dual-endless belt construction with two opposing working belt surfaces, one for each belt. The belts are likewise shown in cross-section.
Figure 10:
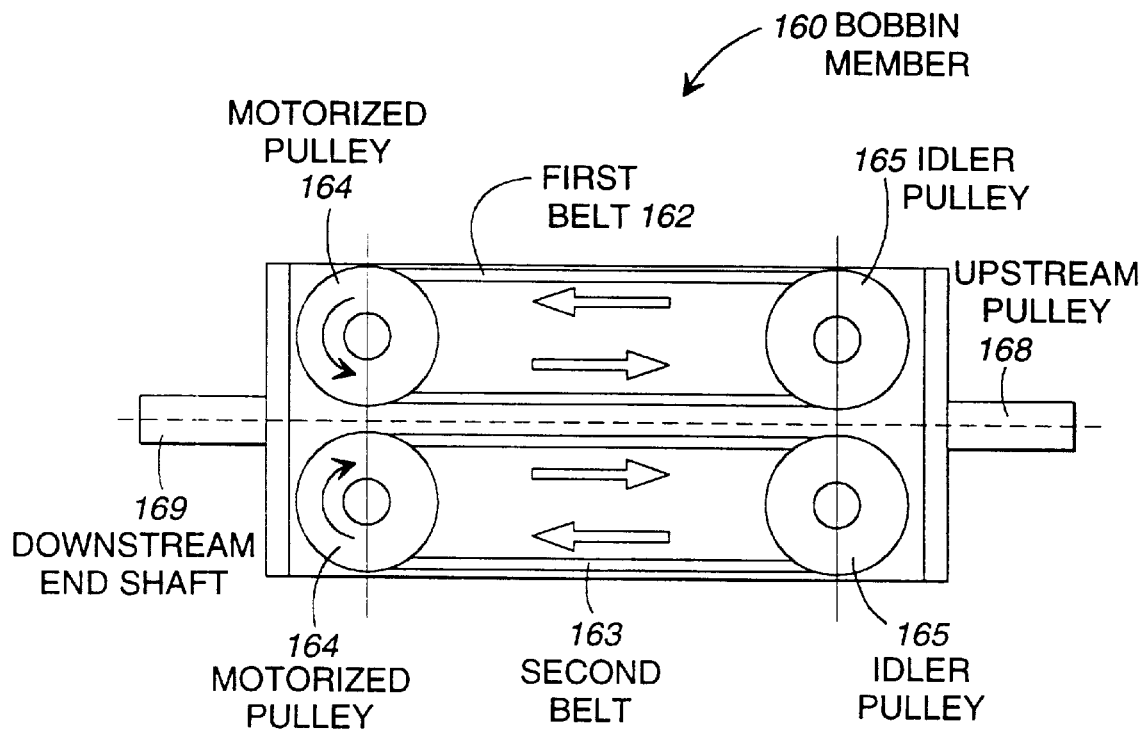
FIG. 10 is a right side elevational illustrative view of a bobbin member 160 such as shown in FIG. 9, with the shell partially removed to expose the dual-endless belt construction which provides two opposing working belt surfaces, which are substantially horizontal as viewed.

Fourth Embodiment (FIGS. 9–10)

Figure 11:
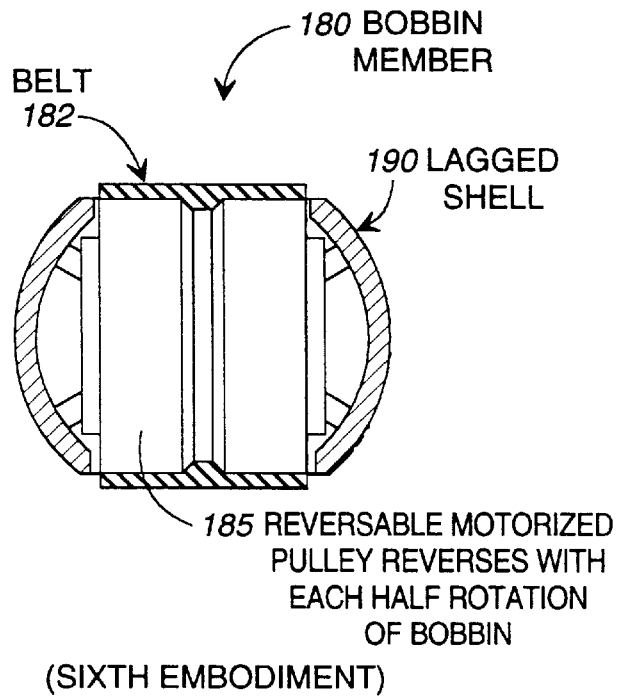
FIG. 11 is a downstream end partial cross-sectional view of an isolated bobbin member 160 according to a fifth embodiment of the present invention. This view shows the lagged shell 190 in cross-section, exposing one of the reversible motorized pulleys 185 supporting the single endless belt 182, also shown in cross-section.
Figure 12:
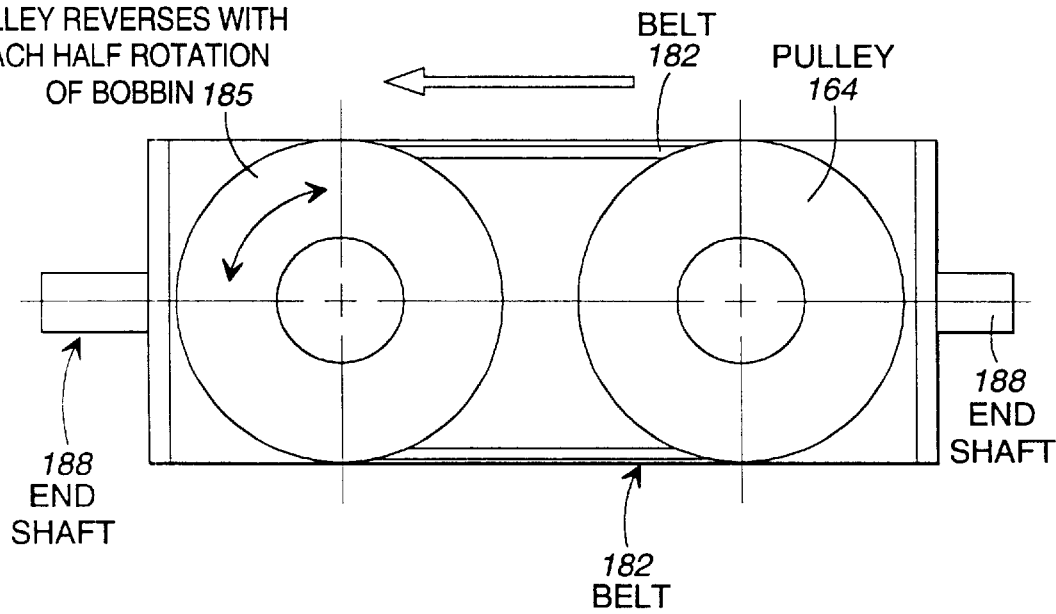
FIG. 12 is a right side elevational illustrative view of a bobbin member 180 shown in FIG. 11, with the shell partially removed to expose the single but reversible belt construction which provides two opposing working belt surfaces, which are substantially horizontal as reviewed.

A double "truncated" bobbin is likewise contemplated under the present invention, as shown in FIGS. 9–12. FIGS. 9–10 illustrate a fourth embodiment of the invention which includes a double truncated bobbin which includes a pair of belts. FIGS. 11 and 12 illustrate a fifth embodiment, discussed later, which includes a double truncated bobbin with a single belt and a reversible motor configuration which reverses the belt with each half rotation around the longitudinal, horizontal, shaft.

Referring first to FIGS. 9 and 10, shown is a fourth embodiment of the present invention. This embodiment includes a framework which includes an upstream end shaft 168 and a downstream end shaft 169 which function similar to other end shafts in this discussion. The framework supports four pulleys, at least two of which are motorized. In the embodiment shown, the motorized pulleys 164 are the two "downstream" pulleys, with the idler pulleys 165 being the two upstream pulleys.

In the embodiment shown, each of the two belts 162, 163, is supported by one powered pulley and one idler pulley, although two powered pulleys could be used for one belt as power needs so dictate. The two conveyor belts 162, 163 have the same width and extend substantially across the pulley widths.

As shown in FIGS. 9 and 10, this includes a "double-truncated" shell 170 configuration, in which two exposed conveyor surfaces are present. This allows for a conveyor surface to be exposed upon each 180 degree rotation of the bobbin assembly 160 of FIGS. 9 and 10. As may be understood, this allows for rotation of the conveyor belts 162, 163 in the direction shown by the arrows in a continuous manner, without regard to the orientation of the bobbin member.

Fifth Embodiment (FIGS. 11-12)

FIGS. 11 and 12 show a fifth embodiment of the present invention including a double-truncated bobbin member 180 configuration, in which a "reversible" internal pulley configuration is shown. This embodiment is shown including a bobbin member 180 having a truncated shell 190, and a single belt 182 driven by two synchronized motorized pulleys 164 (or, depending upon power requirements, one motorized pulley and one idler pulley) and two end shafts 188. The single belt 181 is driven by the reversible motorized pulley(s) 164 which reverse with each half rotation of the bobbin member 180 about its longitudinal axis. As may be understood, this allows for the provision of an exposed conveyor surface upon each 180 degree rotation of the bobbin member 180, but does require the reversing of the motor.

Figure 13:
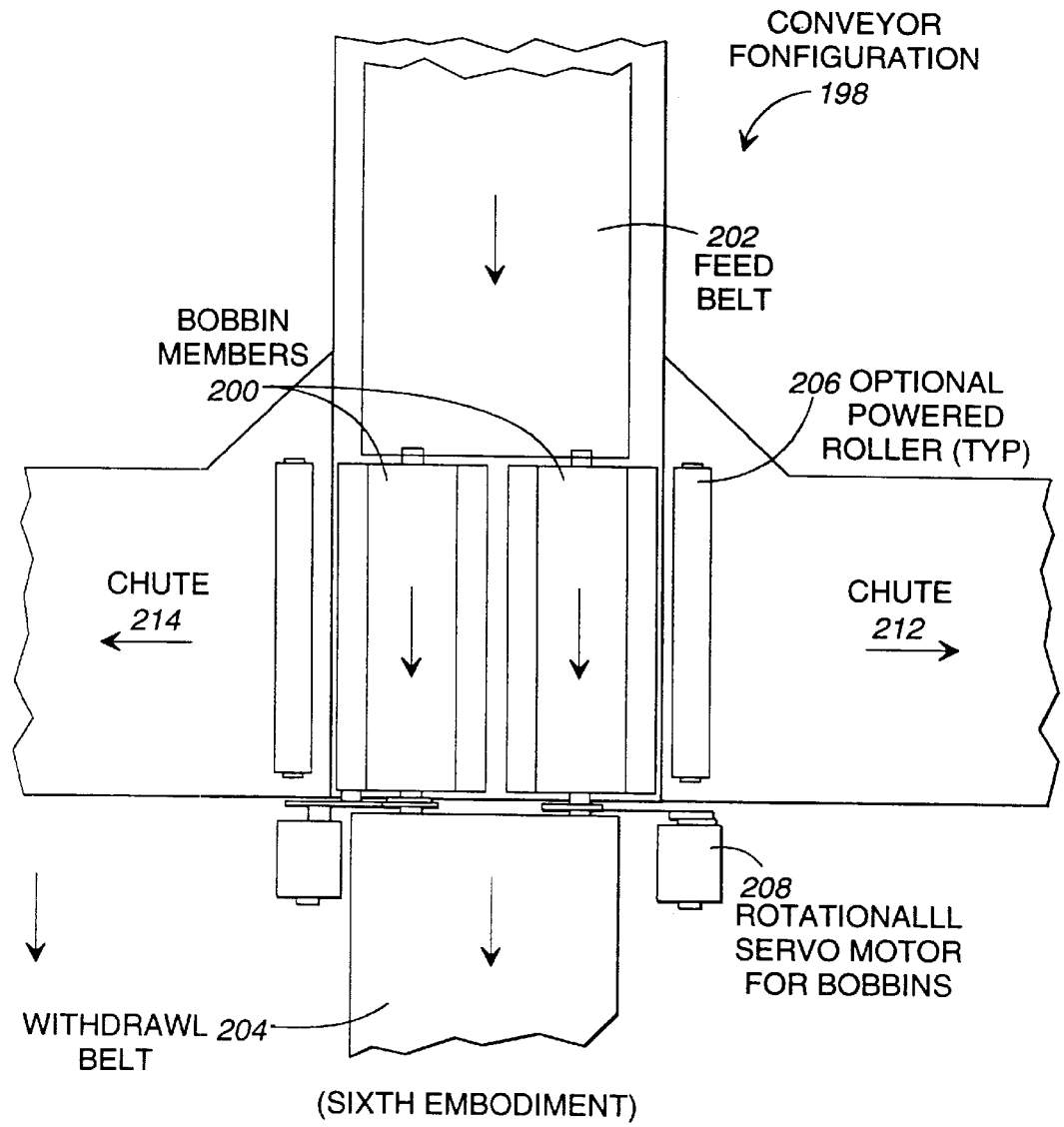
FIG. 13 is a top plan view of a conveyor configuration 198 according to a sixth embodiment of the present invention, which incorporates two tandem bobbin members 200, a feed belt 202, a withdrawal belt 204, and opposing side chutes 212, 214.
Figure 14:
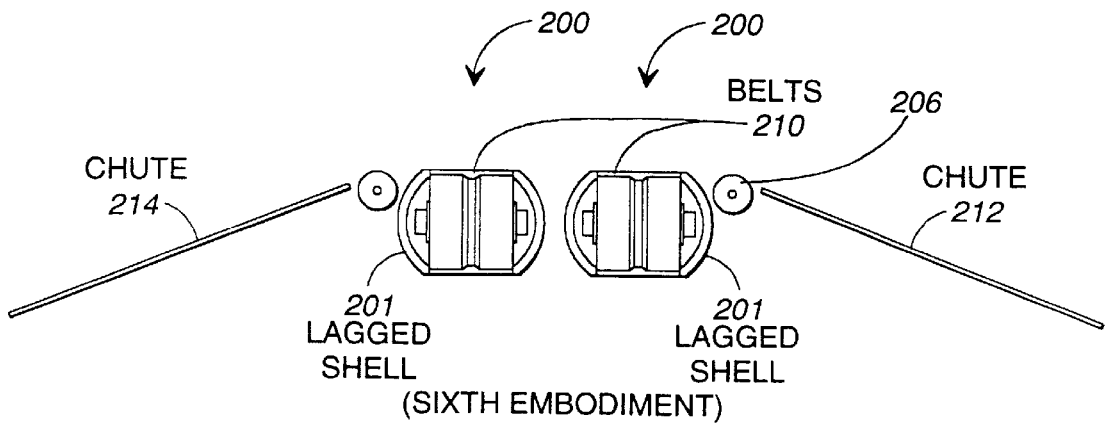
FIG. 14 is a downstream end elevational view of the two tandem bobbin members 200 of FIG. 13, shown between two rollers 206 (which may be powered) and the two chutes 212, 214.

Sixth Embodiment (FIGS. 13–14)

FIGS. 13 and 14 show a sixth embodiment of the present invention, which includes two single-belt bobbins 200 in tandem, which are reversible individually from a controller (not shown). This allows for selective rotation of a package when it is placed atop the two tandem bobbins. The embodiment includes a feed belt 202, a withdrawal belt 204, two side ejection rollers 206 (which can be idlers or powered by servo motors 208) the two tandem bobbin members 200, and two side chutes 212, 214. The bobbin members shown include double truncated shells 201, although single-truncated configurations are contemplated.

The configuration shown in FIGS. 13 and 14 also includes the provision of two power rollers 206 adjacent the sides of a conveyor, although these rollers could alternately be idling rollers.

This configuration can provide two features: in-line package alignment correction and package turning prior to discharge. In-line package correction can be used to correct alignment of the package, as they are being passed down the conveyor without being ejected. As may be understood, if a package is "crooked" on the conveyor, one of the conveyors on one of the bobbins can be driven at a faster speed than the other, to properly align the package as it is then passed further on down the conveyor path.

The use of two tandem bobbins with independent integral conveyors can also allow for turning of a package prior to its side discharge from the conveyor path. This is particularly useful when particularly long packages are being discharged. Typically a long package will be conveyed with its long axis parallel to the conveying axis. In the instance of side discharge, the package will need to be turned in order to maintain its long axis parallel to the conveying axis. Therefore, the respective belts on the two bobbins can then be driven at different speeds (or different directions) in order to cause the package to turn as desired. It may be understood that the package might not need to be completely turned ninety degrees (90°) from its initial orientation, but it may need only to be sufficiently rotated enough so that its "lead" end is adequately directed into the mouth of an exit chute. If desired, side justification or other adequate alignment means may then be used to completely align the package on its new path or in its desired destination.

Alternative Embodiments

It should be understood that the various embodiments disclosed above include certain features which could be used in other embodiments, and therefore the disclosure of such embodiments should not be considered or limiting. For example, the "eccentric" shell design of FIG. 7 could be used with the first embodiment of FIGS. 1–3, assuming space was available within the bobbin. Furthermore, the "detachable" concept of FIGS. 4–6 could be used in other embodiments. Finally, the single- and double-truncated shell configurations could be used, in many cases, interchangeably.

Roller conveyors could likewise be used in the bobbins, if so desired. These roller conveyors could either be powered rollers or idler rollers. In the case of idler rollers, it could be preferably to incline the bobbins, to facilitate movement of packages thereon under the influence of gravity.

Materials

As noted above, the single-or double-truncated drums or "shells" used in various embodiments above may be "lagged" with rubber such that the packages are suitably gripped when contacting the shell outer surface. The type of rubber is not critical, and it should be understood that the rubber could be sprayed on, or secured in sheet form by gluing or fasteners. The rubber could be applied to a thickness of approximately $\frac{1}{8}$", either in the spray or sheet form. Silicone or latex rubber could be used without departing from the spirit and scope of the present invention. Such rubber could be textured as known in the art to provide optimum gripping capabilities.

It should be also be understood that any of the truncated shells shown could be provided with integral external elongate "ribs", which extend along the length of the shell. Such a configuration could easily be provided by extruding the shell during manufacture. These "splines" could be $\frac{1}{8}$" wide and $\frac{1}{16}$" high and spaced as desired.

The shell could be made of aluminum, steel, or fiberglass. It should be appreciated that weight is somewhat of a concern especially in high speed applications.

Timing/Speeds

As noted above, travel speed of the packages on the bobbin and in the conveyor line can be in the range of 300–400 feet per minute . The timing in which the bobbin rotates can depend on parcel size. For long parcels, the rotation will be earlier, and for shorter parcels, rotation can be later.

Conclusion

It should be understood that the words "pivoting" and "rotating" are used throughout this specification, and are meant to be used interchangeably, albeit not in a limiting manner. The bobbin members can be considered to either "pivot" or "rotate" either partially or completely throughout a 360° range.

While this invention has been described in specific detail with reference to the disclosed embodiments, it will be understood that many variations and modifications may be effected within the spirit and scope of the invention as described in the appended claims.

What is claimed is:

1. An apparatus for conveying an item along a conveying path or selectively discharging said item sidewardly from said path to either of two side discharge locations being on opposite sides of said path, said apparatus comprising:

a substantially stationary frame;

a pivoting conveyor mount pivotably mounted relative to said frame about a pivot axis, said pivoting conveyor mount being pivotable within a pivot range extending to either side of a neutral position;

a conveyor mounted relative to said pivoting conveyor mount and defining a conveying surface configured to vary in orientation with the rotation of said pivoting conveyor mount, but being substantially horizontal and facing substantially upwardly when said pivoting conveyor mount is in said neutral position; and means for pivoting said conveyor mount in either of two directions from said neutral position to cause packages positioned atop said conveyor to be discharged therefrom towards either of said two corresponding side discharge locations.

2. The apparatus as claimed in claim 1, wherein said pivoting axis is substantially below the centerline of said conveyor.

3. The apparatus as claimed in claim 1, wherein said conveyor includes a single flexible belt having its surface substantially defining the width of said conveying path.

4. The apparatus as claimed in claim 1, wherein said conveyor includes at least two laterally adjacent flexible belts lying to either side of the centerline of said conveying path.

5. The apparatus as claimed in claim 1, wherein said conveyor an rotate at least 180 degrees to either side of said neutral position thus enabling complete rotation of the conveyor about an axis.

6. The apparatus as claimed in claim 1, wherein said conveyor can rotate at least 360 degrees to either side of said neutral position.

7. An apparatus for attachment to a substantially stationary frame for conveying an item along a conveying path or selectively discharging said item sidewardly from said path to either of two side discharge locations being on opposite sides of said path, said apparatus comprising:

a pivoting conveyor mount pivotably mounted relative to said frame about a pivot axis, said pivoting conveyor mount being pivotable within a pivot range extending to either side of a neutral position; and a conveyor mounted relative to said pivoting conveyor mount and defining a conveying surface configured to vary in orientation with the rotation of said pivoting conveyor mount, but being substantially horizontal and facing substantially upwardly when said pivoting conveyor mount is in said neutral position, said pivoting conveyor mount configured to pivot in either of two directions from said neutral position to cause packages positioned atop said conveyor to be discharged therefrom towards either of said two corresponding side discharge locations.

8. The apparatus as claimed in claim 7, wherein said pivot axis is substantially below the centerline of said conveyor.

9. The apparatus as claimed in claim 7, wherein said conveyor includes a single flexible belt having its surface substantially defining the width of said conveying path.

10. The apparatus as claimed in claim 7, wherein said conveyor includes at least two laterally adjacent flexible belts lying to either side of the centerline of said conveying path.

11. The apparatus as claimed in claim 7, wherein said conveyor can rotate at least 180 degrees to either side of said neutral position.

12. The apparatus as claimed in claim 7, wherein said conveyor can rotate at least 360 degrees to either side of said neutral position.

13. An apparatus for conveying an item along a conveying path or selectively discharging said item sidewardly from said path to either of two side discharge locations being on opposite sides of said path, said apparatus comprising:

a substantially stationary frame;

a pivoting conveyor mount pivotably mounted relative to said frame along a pivot axis, said pivoting conveyor mount being pivotable within a pivot range extending to either side of a neutral position;

a conveyor mounted relative to said pivoting conveyor mount and defining a conveying surface configured to vary in orientation with the rotation of said pivoting conveyor mount, but being substantially horizontal and facing substantially upwardly when said pivoting conveyor mount is in said neutral position;

electric motor means for powering said conveyor, said electric motor means mounted relative to said pivoting conveyor mount to pivot therewith; and means for pivoting said conveyor mount in either of two directions from said neutral position to cause packages positioned atop said conveyor to be discharged therefrom towards either of said two corresponding side discharge locations.

14. The apparatus as claimed in claim 13, wherein said conveyor includes at least two laterally adjacent flexible belts lying to either side of the centerline of said conveying path, and wherein said motor is elongate and includes two opposing output shafts, one at each of its ends, each of said output shafts configured to drive a corresponding one of said two belt conveyors.

15. The apparatus as claimed in claim 13, wherein said conveyor can rotate at least 180 degrees to either side of said neutral position.

16. The apparatus as claimed in claim 13, wherein said conveyor can rotate at least 360 degrees to either side of said neutral position.

17. The apparatus as claimed in claim 13, wherein said conveyor includes at least one flexible endless conveyor belt and at least two supporting pulleys rotatably mounted relative to said pivoting conveyor mount.

18. An apparatus for conveying an item along a conveying path or selectively discharging said item sidewardly from said path to either of two side discharge locations being on opposite sides of said path orientation, said apparatus comprising:

a substantially stationary frame;

a rotating member pivotably mounted relative to said frame along a pivot axis, said rotating member being pivotable within a pivot range extending to either side of a neutral position;

a conveyor mounted relative to said conveyor and defining a conveying surface configured to vary in orientation with the rotation of said pivoting conveyor mount, but being substantially horizontal and facing substantially upwardly when said pivoting conveyor mount is in said neutral position;

package engagement means attached to the exterior of said rotating member; and means for pivoting said conveyor mount in either of two directions from said neutral position to cause packages positioned atop said conveyor to be discharged therefrom towards either of said two corresponding side discharge locations and urged towards said side discharge stations upon contact with said package engagement means.

19. The apparatus as claimed in claim 18, wherein said package engagement means is a substantially cylindrical shell attached about the exterior of said rotating member having an exterior surface covered with a friction enhancing surface.

20. The apparatus as claimed in claim 19, wherein said shell is substantially cylindrical and is mounted such that its cylindrical center lies along said pivot axis.

21. The apparatus as claimed in claim 19, wherein said shell is substantially cylindrical and is mounted such that its cylindrical center lies below said axis, such that an eccentric motion is achieved.

22. The apparatus as claimed in claim 19, wherein said friction enhancing surface is rubber.

23. The apparatus as claimed in claim 18, wherein said means for pivoting said conveyor mount is a motor externally attached relative to said frame.

24. The apparatus as claimed in claim 18, wherein said means for pivoting said conveyor mount is a motor attached relative to said rotating member.

25. The apparatus as claimed in claim 18, wherein said friction enhancing surface is rubber.

26. An apparatus for conveying an item along a conveying path or selectively discharging said item sidewardly from said path to either of two side discharge locations being on opposing sides of said path, said apparatus comprising:

a substantially stationary frame portion;

a rotating member pivotably mounted relative to said frame along a pivot axis, said rotating member being pivotable within a pivot range extending to either side of a neutral position;

conveyor means mounted relative to said rotating member and defining first and second opposing conveying surfaces configured to vary in orientation with the rotation of said rotating member, each being substantially horizontal and facing substantially upwardly and downwardly, respectfully, when said rotating member is in said neutral position; and means for pivoting said rotating member in either of two directions from said neutral position to cause packages positioned atop said upwardly-directed conveyor surface to be discharged therefrom towards either of said two corresponding side discharge locations.

27. The apparatus as claimed in claim 26, wherein said conveyor means comprises two separate endless belts each configured to provide one of said conveyor surface portions.

28. The apparatus as claimed in claim 27, wherein each of said belts is driven by separate motors.

29. The apparatus as claimed in claim 26, wherein said conveyor means includes one endless belt each configured to provide both of said conveyor surface portions.

30. The apparatus as claimed in claim 29, wherein said one endless belt is selectively reversible to allow for discharge of said item regardless to whether said rotating member is in said neutral position, or is pivoted to an inverted position such that said first and second conveying surfaces are facing downwardly and upwardly, respectfully.

31. The apparatus as claimed in claim 26, wherein said conveyor includes at least one flexible endless conveyor belt and at least two supporting pulleys rotatably mounted relative to said rotating member.

32. An apparatus for conveying an item along a conveying path or selectively discharging said item sidewardly from said path to either of two side discharge locations being on opposite sides of said path, said apparatus comprising:

a substantially stationary frame portion;

a first rotating member pivotably mounted relative to said frame along a pivot axis, said rotating member being pivotable within a pivot range extending to either side of a neutral position;

a second rotating member pivotably mounted relative to said frame along a second pivot axis substantially parallel to said first pivot axis, said second rotating member being pivotable within a pivot range extending to either side of a neutral position;

first conveyor means mounted relative to said first rotating member and defining a conveying surface configured to vary in orientation with the rotation of said first rotating member, said first conveying surface being substantially horizontal and facing substantially upwardly when said first rotating member is in said neutral position; and second conveyor means mounted relative to said second rotating member and defining a second conveying surface configured to vary in orientation with the rotation of said second rotating member, said second conveying surface being substantially horizontal and facing substantially upwardly when said second rotating member is in said neutral position; and means for pivoting said first and second rotating members in either of two directions from said neutral position to cause packages positioned atop said upwardly-directed conveyor surfaces to be discharged therefrom towards either of said two corresponding side discharge locations.

33. The apparatus as claimed in claim 32, wherein said first and second rotating members can be rotated in the same direction and at substantially the same speed in order to discharge said items.

34. The apparatus as claimed in claim 32, wherein said first and second conveyors can be driven in opposing directions while each in their neutral positions in order to reorient said items prior to their discharge.

35. The apparatus as claimed in claim 32, wherein said conveyor includes at least one flexible endless conveyor belt and at least two supporting pulleys rotatably mounted relative to said pivoting conveyor mount.

36. A method for conveying an item along a conveying path or selectively discharging said item sidewardly from said path to either of two side discharge locations being on opposite sides of said path, said method comprising the steps of:

a) providing the following assembly:
   1) a substantially stationary frame portions 2) a first rotating member pivotably mounted relative to said frame along a pivot axis, said rotating member being pivotable within a pivot range extending to either side of a neutral position;

3 a second rotating member pivotably mounted relative to said frame along a second pivot axis substantially parallel to said first pivot axis, said second rotating member being pivotable within a pivot range extending to either side of a neutral position;

4 first conveyor means mounted relative to said first rotating member and defining a first conveying surface configured to vary in orientation with the rotation of said first rotating member, said first conveying surface being substantially horizontal and facing substantially upwardly when said first rotating member is in said neutral position;

5 second conveyor means mounted relative to said first rotating member and defining a second conveying surface configured to vary in a orientation with the rotation of said second rotating member, said second conveying surface being substantially horizontal and facing substantially upwardly when said second rotating member is in said neutral position; and 6 means or pivoting said first and second rotating members in either of two directions from said neutral position to cause packages positioned atop said upwardly-directed conveyor surface to be discharged therefrom towards either of said two corresponding side discharge locations, b) conveying a package to a location atop said first and second conveyors; and c) rotating said first and second rotating members in the same direction such that said item is discharged thereby.

37. The method as claimed in claim 36, wherein said discharge step includes simultaneous rotation of said rotating members.

38. The method as claimed in claim 37, further comprising the step of driving said first and second conveyor belts at opposite directions to reorient said item prior to said discharge step.

39. The apparatus as claimed in claim 38, wherein said conveyor includes at least one flexible endless conveyor belt and at least two supporting pulleys rotatably mounted relative to said pivoting conveyor mount.

* * * * *

UNITED STATES PATENT AND TRADEMARK OFFICE
CERTIFICATE OF CORRECTION

PATENT NO.    : 5,967,290
DATED         : October 19, 1999
INVENTOR(S)   : Bonnet Page 1 of 1

It is certified that error appears in the above-identified patent and that said Letters Patent is hereby corrected as shown below:

Column 17, claim 18,
Line 5, replace " conveyor" with -- rotating member --.
Lines 7 and 9, replace "pivoting conveyor mount" with -- rotating member --.
Line 13, replace "conveyor mount" with -- rotating member --.
Line 18, delete "stations" and add -- locations." --.

Column 17, claim 23,
Line 35, replace "conveyor mount" with -- rotating member --.

Column 17, claim 24,
Line 38, replace "conveyor mount" with -- rotating member --.

Column 18, claim 32,
Line 30, after "a" add -- first --.

Column 19, claim 36,
Line 24, replace "or" with -- for --.

Signed and Sealed this

Ninth Day of April, 2002

Attest:

Attesting Officer

JAMES E. ROGAN
Director of the United States Patent and Trademark Office